US011985470B2

(12) United States Patent
Dai et al.

(10) Patent No.: US 11,985,470 B2
(45) Date of Patent: May 14, 2024

(54) METHOD AND DEVICE FOR DETECTING WEARING STATE OF EARPHONES, AND EARPHONES

(71) Applicant: Robert Bosch GmbH, Stuttgart (DE)

(72) Inventors: Chunlei Dai, Shanghai (CN); Tongtong Jiao, Shanghai (CN); Ji Chen, Shanghai (CN); Bin Du, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 17/772,021

(22) PCT Filed: Oct. 27, 2020

(86) PCT No.: PCT/EP2020/080117
§ 371 (c)(1),
(2) Date: Apr. 26, 2022

(87) PCT Pub. No.: WO2021/110326
PCT Pub. Date: Jun. 10, 2021

(65) Prior Publication Data

US 2022/0377450 A1 Nov. 24, 2022

(30) Foreign Application Priority Data

Dec. 4, 2019 (CN) ......................... 201911225999.9

(51) Int. Cl.
*H04R 1/10* (2006.01)

(52) U.S. Cl.
CPC ......... *H04R 1/1041* (2013.01); *H04R 1/1091* (2013.01); *H04R 2460/03* (2013.01)

(58) Field of Classification Search
CPC . H04R 1/1041; H04R 1/1091; H04R 2460/03
(Continued)

(56) References Cited

U.S. PATENT DOCUMENTS

| | | | | |
|---|---|---|---|---|
| 10,491,981 | B1 * | 11/2019 | Wang | H04R 1/1041 |
| 2019/0187950 | A1 | 6/2019 | Takemura | |

FOREIGN PATENT DOCUMENTS

| | | | |
|---|---|---|---|
| CN | 105786155 | A | 7/2016 |
| EP | 3 561 646 | A1 | 10/2019 |

OTHER PUBLICATIONS

International Search Report corresponding to PCT Application No. PCT/EP2020/080117, dated Jan. 25, 2021 (English language document) (3 pages).

* cited by examiner

*Primary Examiner* — Thjuan K Addy
(74) *Attorney, Agent, or Firm* — Maginot, Moore & Beck LLP

(57) ABSTRACT

A method is for determining a wearing state of earphones. The method includes determining an onto-ears event or off-ears event experienced by the earphones on the basis of first data indicating motion of the earphones. The method further includes determining a first wearing state of the earphones on the basis of second data indicating proximity of the earphones to a user's skin. The method additionally includes determining the wearing state of the earphones on the basis of the determined onto-ears event or off-ears event and the first wearing state. This increases the accuracy of detection of the wearing state of the earphones. Based on this more accurately determined wearing state, the earphones can switch appropriately between a low power consumption mode and a normal operating mode, thereby improving the energy consumption of the earphones.

13 Claims, 6 Drawing Sheets

100

(58) Field of Classification Search
USPC .............................. 381/74, 68, 313, 312, 67
See application file for complete search history.

METHOD AND DEVICE FOR DETECTING WEARING STATE OF EARPHONES, AND EARPHONES

This application is a 35 U.S.C. § 371 National Stage Application of PCT/EP2020/080117, filed on Oct. 27, 2020, which claims the benefit of priority to Serial No. CN 201911225999.9, filed on Dec. 4, 2019 in China, the disclosures of which are incorporated herein by reference in their entirety.

The present invention relates to the technical field of electronics, in particular to the detection of a wearing state of earphones.

BACKGROUND

Earphones are widely used in everyday life. To reduce the power consumption of earphones, it is desired that the earphones should enter a low power consumption mode automatically when a user is not wearing the earphones, and automatically return to a normal mode when the user is wearing the earphones. To this end, the detection of an earphone wearing state is of vital importance. Erroneous detection of the earphone wearing state will not only result in an unnecessary increase in power consumption, but might also cause inconvenience to the user.

At present, an acceleration sensor is commonly used to collect motion data to identify a state in which the earphones have been picked up, in order to detect the earphone wearing state; when it is determined that the earphones have been picked up, they are considered to be in a state of being worn, and the earphones are therefore caused to enter a normal mode, otherwise they are kept in a low power consumption mode.

There is also a method in which data collected by an acceleration sensor is analysed to determine whether the earphones have been picked up, and an overall judgment of the earphone wearing state is made in conjunction with data collected by another sensor (such as a proximity sensor and/or micro motion sensor).

However, there is still a demand for more accurate determination of the earphone wearing state.

SUMMARY

It is desired to provide a method and device for detecting an earphone wearing state, and corresponding earphones, which are capable of determining the wearing state of earphones more accurately.

According to one aspect, a method for determining a wearing state of earphones is provided, comprising: determining an onto-ears event or off-ears event experienced by the earphones on the basis of first data indicating motion of the earphones; determining a first wearing state of the earphones on the basis of second data indicating proximity of the earphones to a user's skin; and determining the wearing state of the earphones on the basis of the determined onto-ears event or off-ears event and the first wearing state.

According to another aspect, a device for determining a wearing state of earphones is provided, comprising: a receiving unit, configured to acquire first data and third data indicating motion of the earphones and second data indicating proximity of the earphones to a user's skin; and a processing unit, configured to execute the method steps according to the embodiments of the present invention.

According to another aspect, earphones are provided, comprising: an acceleration sensor, configured to collect first data and third data indicating motion of the earphones; a proximity sensor, configured to collect second data indicating proximity of the earphones to a user's skin; and the device for determining a first wearing state of earphones according to the embodiments of the present invention.

According to another aspect, a machine-readable storage medium is provided, storing a computer program instruction which, when run, causes a computer to execute the method according to the embodiments of the present invention.

Unlike simply identifying whether earphones have been picked up, in the embodiments according to the various aspects of the present disclosure, the process of the earphones being put on or taken off is taken into account. A signal specific to when the user is indicated as putting the earphones on or taking them off the ears is identified from first data indicating motion of the earphones, and an onto-ears event or off-ears event is thereby identified. In the case of in-ear earphones, the onto-ears event can correspond to an into-ears event of plugging the earphones into the ears, and the off-ears event can correspond to an out-of-ears event of taking the earphones out of the ears. In the case of headphone-type earphones, the onto-ears event can correspond to an event of fixing ear cups to the ears, and the off-ears event can correspond to an event of detaching the ear cups from the ears. In addition, taking into consideration the fact that the actions of putting on and taking off the earphones will be accompanied for example by a change in an optical signal indicating proximity, a comprehensive judgment of the wearing state of the earphones is made at least in conjunction with an earphones state determined on the basis of second data indicating proximity of the earphones to the user's skin, while taking into account an onto-ears event or off-ears event. This increases the accuracy of detection of the wearing state of the earphones; based on this more accurately determined wearing state, the earphones can switch appropriately between a low power consumption mode and a normal operating mode, thereby improving the energy consumption of the earphones.

According to one embodiment of the various aspects, when it is determined that the earphones have experienced the onto-ears event and the first wearing state indicates that the earphones are in a worn state, it is determined that the wearing state of the earphones is a worn state.

Thus, taking into account the action of the user putting on the earphones, by determining an onto-ears event, and determining a first wearing state according to data of a proximity sensor, e.g. data of a light sensor indicating that light has been blocked, it is possible to accurately detect the process of the user fixing the earphones to the ears, and thereby accurately determine that the earphones are in a state of just having been put on.

According to one embodiment of the various aspects, when it is determined that the earphones have experienced the off-ears event and the first wearing state indicates that the earphones are in a non-worn state, it is determined that the wearing state of the earphones is a non-worn state.

Thus, taking into account the action of the user taking off the earphones, by determining an off-ears event, and determining a first wearing state according to data of a proximity sensor, e.g. data of a light sensor indicating that light has become unblocked, it is possible to accurately detect the process of the user detaching the earphones from the ears, and thereby accurately determine that the earphones are in a state of just having been taken off.

According to one embodiment of the various aspects, the first data is separately compared with a first predetermined mode indicating the onto-ears event of the earphones and a second predetermined mode indicating the off-ears event of the earphones; and the onto-ears event or the off-ears event is determined on the basis of the comparison result. This provides detection of onto-ears and off-ears events.

According to another embodiment of the various aspects, third data indicating motion of the earphones is compared with a first predetermined threshold, to determine whether the earphones have been picked up, wherein the third data is collected before the first data; and the onto-ears event or the off-ears event of the earphones is determined on the basis of the first data, in response to determining that the earphones have been picked up.

In this embodiment, detecting an onto-ears or off-ears event corresponding to the earphones being fixed to or detached from the ears is preceded by detecting whether the earphones have been picked up. As will be understood, before the earphones are put on or taken off, the user will first pick up the earphones, and will then move the earphones to perform an onto-ears or off-ears action. Thus, in this embodiment, the entire process of the user putting on or taking off the earphones can be detected more accurately, with subsequent processing being performed only in response to the user picking up the earphones; this further reduces the energy consumption of the earphones.

According to another embodiment of the various aspects, the first wearing state of the earphones is determined on the basis of the second data indicating proximity of the earphones to the user's skin, in response to determining that the earphones have been picked up.

According to another embodiment of the various aspects, the first wearing state of the earphones is determined on the basis of the second data indicating proximity of the earphones to the user's skin, in response to determining the onto-ears event or the off-ears event.

In the above embodiment, detection of the wearing state on the basis of the second data is activated only when it is detected that the earphones have been picked up or when an onto-ears or off-ears event is detected; this can further reduce the energy consumption of the earphones.

According to another embodiment of the various aspects, an amplitude of the second data is compared with a second predetermined threshold; and the first wearing state of the earphones is determined on the basis of a result of the comparison. This provides detection of the first wearing state on the basis of the second data.

According to another embodiment of the various aspects, a pulse signal is extracted from the second data, in response to determining the off-ears event; an amplitude and a pulse width of the pulse signal are compared with a second predetermined threshold and a third predetermined threshold respectively; and the first wearing state of the earphones is determined on the basis of a result of the comparison. This takes into account a situation in which the earphones have just been detached from the ears, but the proximity sensor is blocked by another object. More comprehensive and accurate detection of the wearing state is thereby provided.

BRIEF DESCRIPTION OF THE DRAWINGS

In the drawings, embodiments are explained merely through examples, without limitation; similar reference labels in the drawings denote similar elements.

Figure 1:
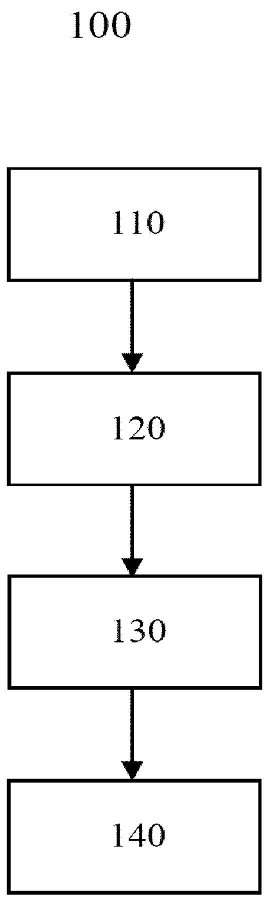
FIG. 1 shows a method for determining a wearing state of earphones according to an embodiment.

Various aspects and features of the embodiments of the present invention are described with reference to the drawings above. The above drawings are merely schematic, not restrictive. Without deviating from the substance of the present invention, the sizes, shapes, labels or appearance of the elements in the above drawings may vary; they are not limited to only those shown in the drawings attached to the specification.

DETAILED DESCRIPTION

According to the various embodiments of the present invention, it is recognized that when putting earphones on, a user will fix the earphones to the ears, i.e. an onto-ears event occurs; and when taking the earphones off, the user will detach the earphones from the ears, i.e. an off-ears event occurs. In the case of in-ear earphones, the onto-ears event can correspond to an into-ears event of plugging the earphones into the ears, and the off-ears event can correspond to an out-of-ears event of taking the earphones out of the ears. In the case of headphone-type earphones, the onto-ears event can correspond to an event of fixing ear cups to the ears, and the off-ears event can correspond to detaching the ear cups from the ears. The detection of the onto-ears or off-ears event of the user fixing the earphones to the ears or detaching the earphones from the ears will be meaningful for accurately determining the wearing state of the earphones. In particular, if detection of the onto-ears or off-ears event is combined with detection of proximity of the earphones to the user's skin, the wearing state of the earphones can be determined more accurately. It can be determined that when the user fixes the earphones to the ears or detaches the earphones from the ears, sensor data indicating motion of the earphones will exhibit different signal modes. For example, if an acceleration sensor is used to measure motion of the earphones, then when the user fixes the earphones to the ears or detaches the earphones from the ears, motion data from the acceleration sensor will exhibit different changes in orientation and peaks; thus, it is possible to determine whether the earphones have experienced an onto-ears or off-ears event on the basis of the sensor data indicating motion of the earphones.

FIG. 1 shows a method 100 for determining a wearing state of earphones according to an embodiment. The method 100 comprises the following processing.

In 110, first data indicating motion of the earphones is received. For example, an acceleration sensor disposed on the earphones may be used to measure the first data indicating motion of the earphones. The first data may be continuously collected. In 110, the first data may be received in real time or in a timed manner. As can be expected, first data received in real time is processed in real time; and as can be expected, first data of a predetermined length or timing is processed.

In 120, a determination is made as to whether the earphones have experienced an onto-ears event or an off-ears event on the basis of the first data. The onto-ears event indicates a signal corresponding to the user fixing the earphones to the ears; the off-ears event indicates a signal corresponding to the user detaching the earphones from the ears. By detecting, in the first data, a predetermined mode corresponding to an onto-ears event or off-ears event, it is possible to determine whether the earphones have experienced an onto-ears event or off-ears event.

As stated above, an onto-ears or off-ears event may be manifested as a series of changes in peaks and orientation in motion data from the acceleration sensor, and it is thereby possible to determine a predetermined mode indicating an onto-ears or off-ears event; the predetermined mode may be represented as a threshold for a series of orientation and/or waveform amplitude/width changes.

For example, in the case of an onto-ears event, after the user picks up the earphones, the earphones will first experience an obvious change in orientation, in order to achieve correct alignment with the ears, and will then experience slight vibration and/or rotation, which corresponds to the earplugs or ear cups coming into contact with the ears and being fixed. Thus, a first predetermined mode indicating an onto-ears event of the earphones can be defined as a change in orientation of a predetermined size or size range being indicated first, followed by one or more waveforms of a predetermined amplitude and/or width occurring within a predetermined time. Preferably, the one or more waveforms are of small amplitude and relatively narrow; thus, the abovementioned predetermined amplitude and/or width may be set to be relatively small.

In the case of an off-ears event, conversely to the case of an onto-ears event, after the user picks up the earphones, the earphones will first experience slight vibration and/or rotation, and will then experience an obvious change in orientation. Thus, a second predetermined mode indicating an off-ears event of the earphones can be defined as one or more waveforms of a predetermined amplitude and/or width being indicated first, followed by a change in orientation of a predetermined size or size range occurring within a predetermined time.

As can be seen, the first and second predetermined modes respectively correspond to a series of thresholds for orientation changes, waveform amplitude and/or width, and/or timing, etc. in acceleration data; these thresholds can be compared with measured acceleration data, to determine an onto-ears or off-ears event. In order to distinguish between onto-ears and off-ears events, the order of occurrence of orientation changes and the abovementioned one or more waveforms may also be taken into account. All of the abovementioned thresholds may vary somewhat for onto-ears and off-ears events. Specifically, they may be set for different situations by a person skilled in the art according to his or her experience.

In one embodiment, the first data may be compared with the first predetermined mode indicating an onto-ears event of the earphones and the second predetermined mode indicating an off-ears event of the earphones, and based on a comparison result, a determination can be made as to whether the earphones have experienced an onto-ears event or off-ears event or have not experienced an onto-ears/off-ears event. Specifically, when an orientation change in the first data, a waveform amplitude and/or width therein and the timing/order of occurrence of the orientation change and corresponding waveform correspond to the first predetermined mode, this indicates that the earphones have experienced an onto-ears event. When an orientation change in the first data, a waveform amplitude and/or width therein and the timing/order of occurrence of the orientation change and corresponding waveform correspond to the second predetermined mode, this indicates that the earphones have experienced an off-ears event. When the signal of the first data corresponds to neither the first predetermined mode nor the second predetermined mode, this indicates that the earphones have not experienced any onto-ears/off-ears event. The first predetermined mode and second predetermined mode may be determined in advance by a person skilled in the art according to experience.

In 130, a first wearing state of the earphones is determined on the basis of second data indicating proximity of the earphones to the user's skin. In some situations, the first wearing state may be directly indicated by whether light shining on the earphones is blocked. The second data may be measured by a proximity sensor disposed in the earphones; for example, the second data may be measured by a light sensor disposed on the earphones. The second data may likewise be received in 110 with the first data.

Account is taken of the fact that regardless of whether the user is putting on or taking off the earphones, a signal of the proximity sensor disposed on the earphones will in both cases exhibit a corresponding change after a signal of the acceleration sensor. In a preferred embodiment, the proximity sensor may be activated to acquire the second data after an onto-ears event or off-ears event has been determined in 120. Preferably, the second data is received within a predetermined time period (e.g. 2 seconds) after an onto-ears or off-ears event has been determined according to the first data. In this case, the proximity sensor is activated to acquire the second data only in response to an onto-ears event or off-ears event being determined in 120; in 130, once the acquired second data (e.g. of the predetermined time period) has been received, the first wearing state of the earphones is determined on the basis of the second data. In this case, if no onto-ears or off-ears event is detected in 120, the method returns to 110 to go on to receive new first data, and an onto-ears or off-ears event is determined on the basis of the new first data in 120. The power consumption of the earphones can thereby be further reduced.

Of course, it can also be expected that the proximity sensor continuously monitors the earphones, thereby obtaining continuous second data, but the first wearing state of the earphones will be determined on the basis of the collected second data of a corresponding time period only after an onto-ears event or off-ears event has been determined (or it has been determined that the earphones have been picked up; this will be described below). An advantage of continuously collecting second data is that even when data of the acceleration sensor does not reflect an onto-ears or off-ears event, it is still possible to determine a wearing state of the earphones by detecting second data. For example, if no onto-ears or off-ears event is detected in acceleration data, but optical sensor data indicates that the earphones have been taken off, there is possibility that the earphones are sliding down slowly, and it is thereby possible for the earphones to be automatically switched to a low power consumption state. This can also improve system reliability when erroneous data results from reduced precision or improper setting of the acceleration sensor.

In general, the second data may be compared with a second predetermined threshold to determine the first wearing state of the earphones.

In one embodiment, the second predetermined threshold may indicate signal amplitude. Thus, the amplitude of the second data may be compared with the second predetermined threshold to determine a wearing state of the earphones. For example, when the amplitude of second data from the proximity sensor is greater than a predetermined threshold, e.g. indicating that illuminating light is not blocked, it can be determined that the earphones are in a non-worn state according to the second data, i.e. the first wearing state is a non-worn state. Preferably, if the amplitude of second data from a predetermined time period is always greater than a predetermined threshold, it is determined that the earphones are in a non-worn state. The predetermined time period may be set to be relatively long, e.g. 5 seconds.

In another embodiment, the second data may be compared with a second predetermined threshold and a third predetermined threshold to determine the first wearing state of the earphones; this applies in particular to off-ear scenarios. The second predetermined threshold likewise indicates signal amplitude, in particular indicating a reduced or increased signal amplitude. The third predetermined threshold indicates pulse width (duration). This applies in particular to scenarios in which a pulse signal is present in the second data.

When it has been determined in 120 that an off-ears event has occurred, the amplitude and pulse width (duration) of a corresponding signal, preferably a pulse signal, in the second data (e.g. of a predetermined time period) may be extracted, and compared with the second predetermined threshold and third predetermined threshold. For example, when the pulse signal amplitude extracted from the second data is greater than the second predetermined threshold and the pulse width is greater than the third predetermined threshold, it can be determined that the earphones have been detached from the ears by the user, but the proximity sensor might have been immediately blocked by another object. Thus, the first wearing state is still determined as being a non-worn state. Otherwise, it can be determined that the earphones are in a worn state.

In 140, a wearing state of the earphones is determined on the basis of the determined onto-ears event or off-ears event and the first wearing state. Based on the determined wearing state of the earphones, the earphones can then be caused to enter a corresponding mode.

Specifically, if an onto-ears event is detected in 120 and it is determined that the first wearing state is a worn state in 130, this indicates that the earphones are currently in a state of being worn; this might correspond to a scenario in which the user has just put the earphones on. It is thereby determined in 140 that the earphones are in a worn state, and the earphones can then be switched from a low power consumption mode to a normal mode.

If an off-ears event is detected in 120 and it is determined that the first wearing state is a non-worn state in 130, this indicates that the earphones are in a state of not being worn; this might correspond to a scenario in which the user has just taken the earphones off. It is thereby determined in 140 that the earphones are in a taken-off state, and the earphones can then be switched from the normal mode to the low power consumption mode.

Most components of the earphones can enter a low power consumption mode (such as a sleep mode), e.g. a microcontroller unit, Bluetooth and the proximity sensor. Unlike other components, the acceleration sensor should be guaranteed to be in an operational state, being able to measure motion data from the earphones, and at the same time, a processor associated with the acceleration sensor should be enabled to be in an operational state, in order to be able to determine in real time whether motion has occurred according to motion data of the acceleration sensor. As mentioned above, when it is determined that an onto-ears or off-ears event has occurred according to motion data from the earphones, the microcontroller unit and proximity sensor can be woken up, to perform further processing.

Figure 2:
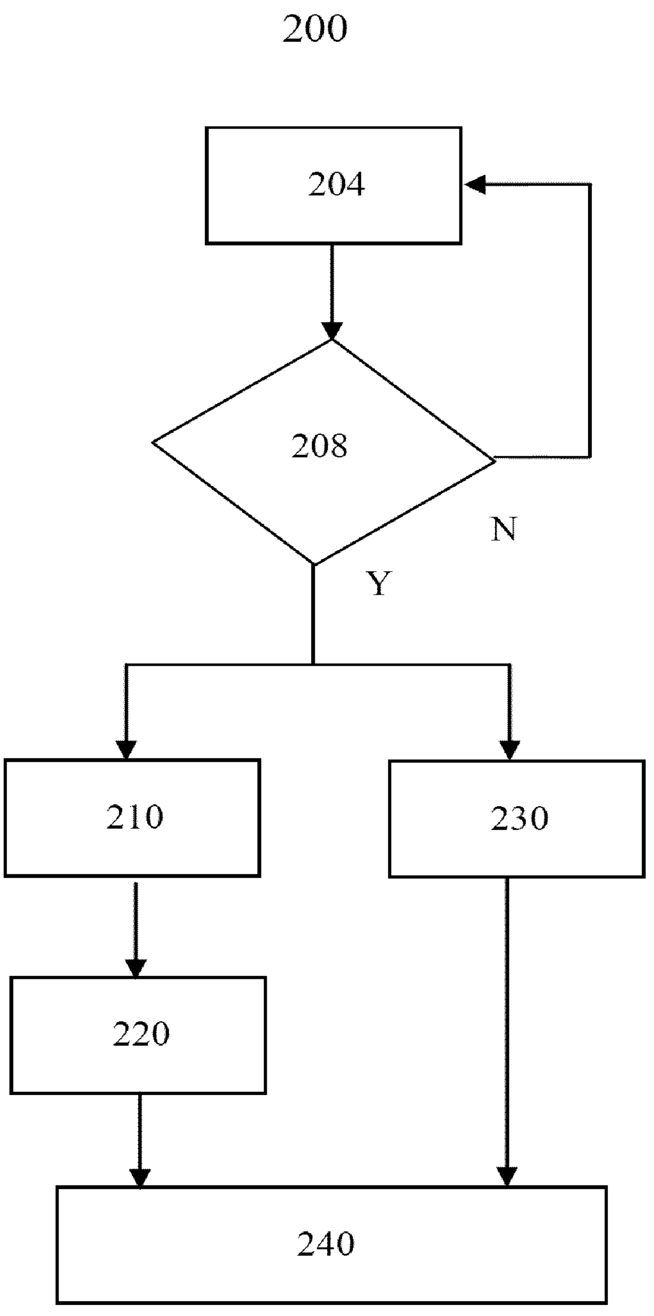
FIG. 2 shows a method for determining a wearing state of earphones according to another embodiment.

FIG. 2 shows a method 200 for determining a wearing state of earphones according to another embodiment. Unlike the process of detection of the earphones in the embodiment shown in FIG. 1, from an onto-ears or off-ears event to a change in an optical signal indicating proximity, an action of the earphones being picked up is further detected in the embodiment shown in FIG. 2.

It will be understood that when the earphones are put on or taken off, the user will first of all pick up the earphones, and only then will move the earphones to perform an onto-ears or off-ears action; thus, it will be meaningful to first of all detect an action of the earphones being picked up, and perform onto-ears or off-ears detection only when it is detected that the earphones have been picked up.

Unlike the method shown in FIG. 1, according to method 200, third data indicating motion of the earphones is received first in 204. In 208, a determination is made as to whether the earphones have been picked up on the basis of the third data; for example, this may be determined by comparing the third data with a first predetermined threshold. For example, when the amplitude of motion data of the earphones is greater than the first predetermined threshold, this indicates that the earphones have been picked up, otherwise it is indicated that the earphones have not been picked up. It is also possible to take into account another change in motion data when the earphones are picked up in order to set a first predetermined threshold, e.g. the width (duration) of a motion pulse signal. Thus, in addition to amplitude, the width of the motion pulse signal may also be compared with a predetermined threshold. In this case, the first predetermined threshold comprises an amplitude threshold and a pulse width threshold; as can be expected, corresponding values such as pulse amplitude and width in the third data are extracted for comparison with the first predetermined threshold.

When it is determined in 208 that the earphones have been picked up, then similarly to 110 shown in FIG. 1, first data indicating motion of the earphones is further collected in 210, and in 220, based on the first data indicating motion of the earphones, a further determination is made as to whether the earphones have experienced an onto-ears event or off-ears event. It will be understood that the first data is collected after the third data, and both may be collected by the same sensor. Taking into account a time period that might be passed through from the earphones being picked up to the earphones being plugged in or taken out, a determination can be made as to whether the earphones have experienced an onto-ears event or off-ears event according to first data collected within a predetermined time period (e.g. 3 seconds) after it is determined that the earphones have been picked up.

In a preferred embodiment, an acceleration sensor may be configured to initially collect third data at a relatively low first data collection frequency, and to switch to collecting first data at a relatively high second data collection frequency when it is determined in 208 that the earphones have been picked up. The abovementioned control of the acceleration sensor may be realized by a microcontroller unit of the earphones in response to a corresponding signal from the acceleration sensor. In this case, the microcontroller unit may first be kept in a low power consumption mode, in which mode it need only be capable of processing third data of a low sampling frequency to identify a pick-up event.

If, within a predetermined time period after it is determined that the earphones have been picked up, it is not determined that the earphones have experienced an onto-ears or off-ears event according to the collected first data, the acceleration sensor may be returned to the state of collecting third data at a relatively low first data collection frequency.

Furthermore, when it is determined in 208 that the earphones have been picked up, a first wearing state of the earphones is further determined in 230 on the basis of second data indicating proximity of the earphones to the user's skin.

In a preferred embodiment, a proximity sensor (such as a light sensor) measuring second data may be configured to be non-operational or collect second data at a relatively low third data collection frequency, and to switch to collecting second data at a relatively high fourth data collection frequency when it is determined in 208 that the earphones have been picked up. This collecting operation may be maintained for a predetermined time period, e.g. 2 seconds as mentioned above. The abovementioned control of the proximity sensor may be realized by the microcontroller unit of the earphones in response to a corresponding signal from the acceleration sensor.

If it is not found that the earphones have been picked up in 208, the method returns to 204 to go on to receive new third data, and in 208, a determination is made as to whether the earphones have been picked up on the basis of the new third data.

Furthermore, in 240, just as in 140, a wearing state of the earphones is determined on the basis of the onto-ears event or off-ears event determined in 220 and the first wearing state determined in 230. Based on the determined wearing state of the earphones, the earphones can then be caused to enter a corresponding mode.

Although, as shown in FIG. 2, the processing of 210 and 220 is executed in parallel with the processing of 230 after the processing of 208, it can be envisaged that the processing of 230 is executed only after an onto-ears event or off-ears event has been determined in 220.

In this case, the proximity sensor may be switched to collecting second data at a relatively high fourth data collection frequency only after an on-ears event or off-ears event has been determined in 220. Then, in 230, the first wearing state is determined on the basis of the collected second data.

Figure 3:
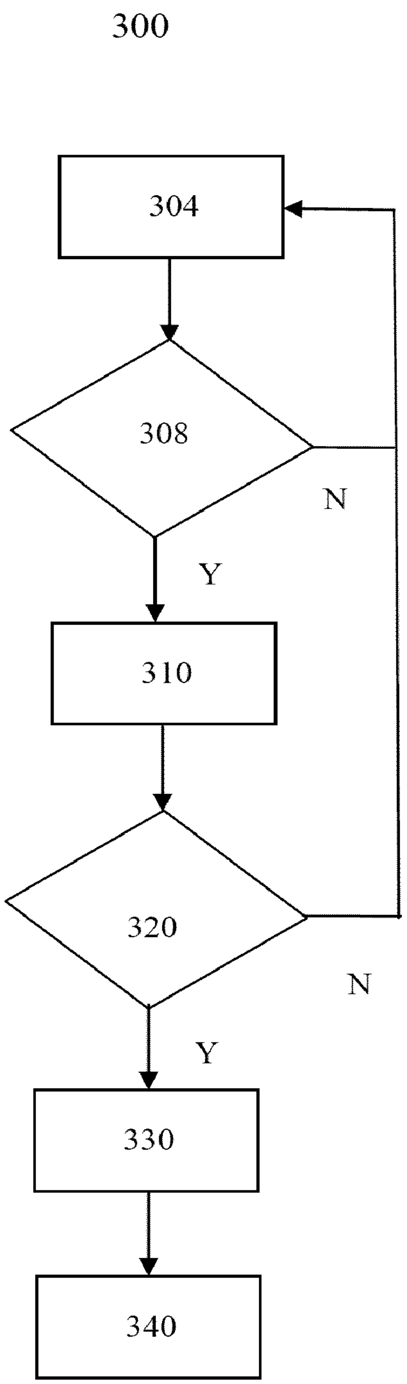
FIG. 3 shows a method for determining a wearing state of earphones according to another embodiment.

FIG. 3 shows a method 300 for determining a wearing state of earphones according to this embodiment. Here, processing 304 and processing 308 are the same as processing 204 and processing 208 shown in FIG. 2.

After it has been determined in 308 that the earphones have been picked up, first data is collected in 310, and a determination is made in 320 as to whether the earphones have experienced an onto-ears or off-ears event on the basis of the collected first data; if no onto-ears or off-ears event has occurred, the method returns to 304, to go on to receive new third data. If it is determined in 320 that an onto-ears or off-ears event has occurred, then in 330, a first wearing state is determined on the basis of second data acquired by a proximity sensor, and then in 340, a wearing state of the earphones is determined on the basis of the determination results in 320 and 330.

Figure 4:
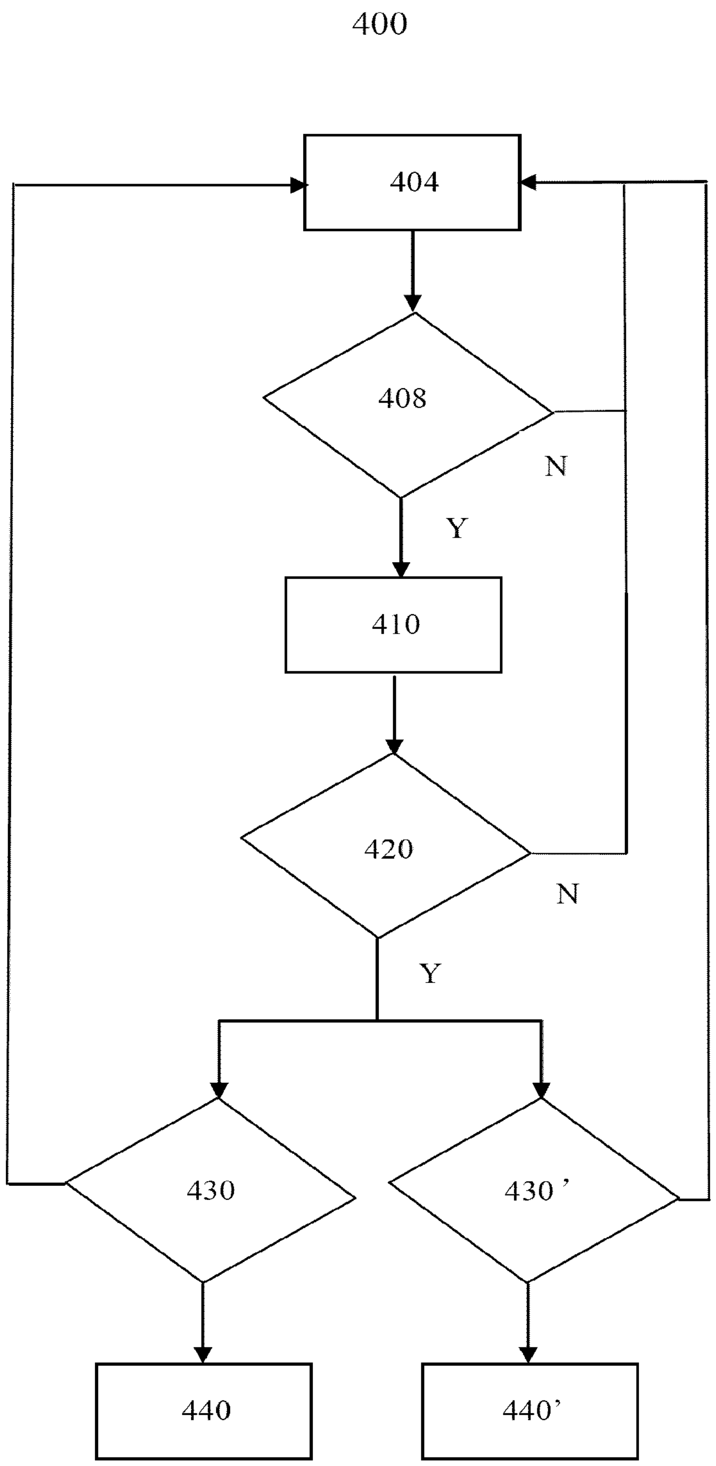
FIG. 4 shows a method for determining a wearing state of earphones according to another embodiment.

FIG. 4 shows a method 400 for determining a wearing state of earphones according to another embodiment. Unlike the embodiment of FIG. 3, this describes in detail the processing that is performed after an onto-ears or off-ears event has been determined in 420. Here, processing 404-420 is the same as 304-320 shown in FIG. 3.

If it is determined in 420 that the earphones have experienced an onto-ears or off-ears event, and an onto-ears event is determined as having been experienced, then a first wearing state of the earphones is determined according to second data in 430; if it is determined in 430 that the earphones are in a worn state, e.g. light sensor data shows that light is blocked, then in 440 it is determined that the earphones have changed to a worn state, and the earphones can then be adjusted from a low power consumption mode to a normal mode. If it is determined in 430 that the earphones are still in a non-worn state, e.g. light sensor data shows that light is not blocked, then the method returns to 410 to receive new first data.

If it is determined in 420 that the earphones have experienced an onto-ears or off-ears event, and an off-ears event is determined as having been experienced, then a first wearing state of the earphones is determined according to second data in 430'; if it is determined in 430' that the earphones are in a non-worn state, e.g. light sensor data shows that light is not blocked or a light sensor of the earphones is blocked by another object immediately after the earphones are taken off, then in 440 it is determined that the earphones have changed to a non-worn state, and the earphones can then be adjusted from the normal mode to the low power consumption mode. If it is determined in 430' that the earphones are still in a worn state, then the method returns to 410 to receive new first data.

The methods of various embodiments have been described above with reference to FIGS. 1-4; as will be understood, the processing operations of different embodiments can be partially combined to obtain a better result, and the processing operations can be altered, split up and combined to achieve an anticipated objective, as long as the spirit of the present invention is not deviated from. The first, second and third predetermined thresholds mentioned above may be set in advance according to different application scenarios. Furthermore, the predetermined time periods mentioned in relation to different scenarios may be set by a person skilled in the art as needed.

Figure 5:
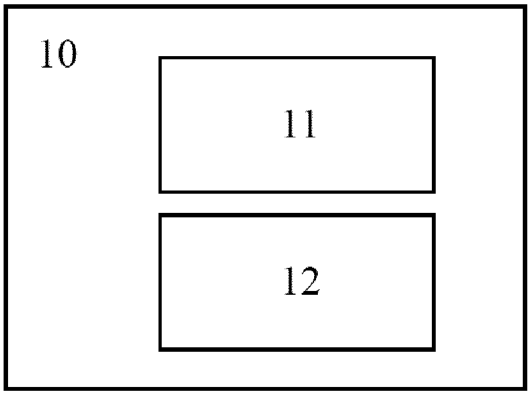
FIG. 5 shows a device for determining a wearing state of earphones according to an embodiment.

FIG. 5 shows a device 10 for determining a wearing state of earphones according to an embodiment. The device 10 comprises a receiving unit 11, configured to receive sensor data from a sensor of the earphones, in particular first data indicating motion of the earphones and second data indicating proximity of the earphones to a user's skin. As in the method described above with reference to FIGS. 1-4, the receiving unit 11 may be configured to receive first data as in the processing of 110, 210, 310 and 410 described above, and to receive second data at an appropriate time.

The device 10 further comprises a processing unit 12, configured to perform further processing on the first data and second data, as in the processing operations described above with reference to FIGS. 1-4, other than 110, 210, 310 and 410. All functions of the processing unit 12 can generally be realized by a microcontroller unit of the earphones.

Although only one processing unit 12 is shown, it can also be envisaged that the processing unit 12 is split up into multiple processing units for the abovementioned processing operations shown with reference to FIGS. 1-4, and some of these processing units are kept in a low power consumption mode, and only switched into a normal mode when necessary.

Figure 6:
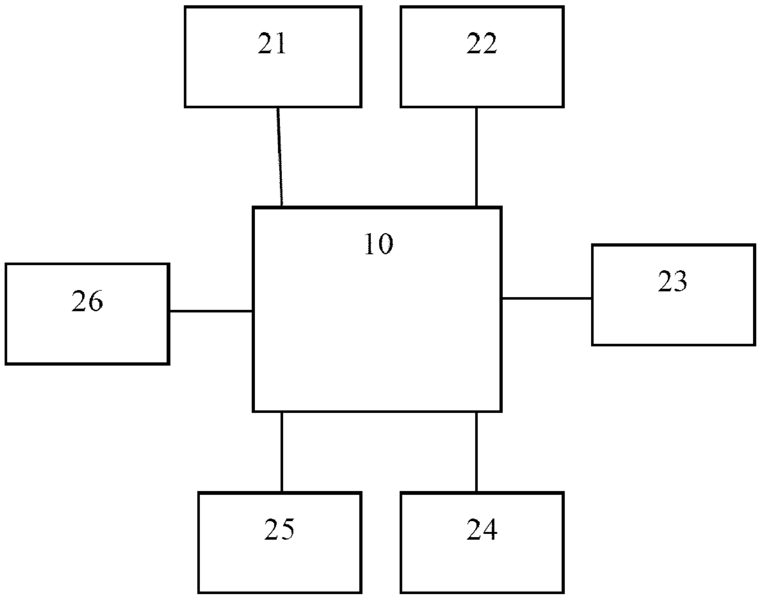
FIG. 6 shows earphones according to an embodiment.

FIG. 6 shows earphones 20 according to an embodiment, which employ the device 10 for determining a wearing state of earphones in the embodiments of the present invention.

Besides the device 10 for determining a wearing state of earphones, the earphones 20 further comprise an acceleration sensor 21, configured to collect first data and third data indicating motion of the earphones; a proximity sensor 22, configured to collect second data indicating proximity of the earphones to a user's skin, the proximity sensor for example being a light sensor; a loudspeaker 23, configured to convert an electrical signal to a sound signal for broadcast to the user; a microphone 24, configured to convert a sound signal from the user to an electrical signal; a Bluetooth device 25; and a battery device 26, configured to power the components of the earphones.

In the earphones 20 shown in FIG. 6, the acceleration sensor 21 may be configured to continuously collect acceleration data, i.e. third data and first data, and the processing unit 12 in the device 10 determines whether the earphones have been picked up according to the third data or determines whether an onto-ears or off-ears event has been experienced according to the first data, and if they have been picked up or have experienced an onto-ears or off-ears event, sends an interrupt signal to a control unit of the earphones (not shown); the control unit can activate or control the proximity sensor to collect second data at a relatively high collection frequency, so as to enable the processing unit 12 to determine a first wearing state according to the second data, and a wearing state of the earphones on the basis of the determination of the onto-ears or off-ears event and the first wearing state; if it is determined that the earphones are in a state of having been put on, the control unit will activate the components of the earphones, such that they enter a normal operating mode, and conversely, if it is determined the earphones are in a state of having just been taken off, the control unit will cause the components of the earphones to enter a low power consumption mode, or even a non-operational mode, to reduce energy consumption. Regarding the control unit that is not shown in FIG. 6, as can be expected, the device 10 and control unit are both part of the microcontroller unit of the earphones. Although only the acceleration sensor and proximity sensor are shown in FIG. 6, the existence of another sensor such as a temperature sensor, in order to sense other sensor data for the purpose of making a comprehensive judgment of the wearing state, is not ruled out.

The control unit can likewise be in a low power consumption mode (or non-operational mode), and is activated to an operational mode by receiving the interrupt signal from the processing unit 12 when it is sensed from acceleration sensor data that the earphones have been picked up or that an onto-ears event or off-ears event has taken place.

In one embodiment, it is only necessary to keep the acceleration sensor and corresponding processing unit in an operational mode, including keeping the acceleration sensor collecting at a low collection frequency, and the corresponding processing unit must be kept in a low power mode which ensures that corresponding acceleration data can be processed. When it is detected that the earphones have been picked up or that an onto-ears event or off-ears event has taken place, the processing unit returns to a normal operating mode, and by means of the control unit causes the proximity sensor to enter a normal operating mode; when a change in the wearing state of the earphones has been determined in conjunction with data of the proximity sensor, the control unit can cause the operating state of each of the components of the earphones to undergo a corresponding change, e.g. switch to a low power consumption mode or normal operating mode.

As will be understood, the method and device for determining a wearing state of earphones in the embodiments of the present disclosure may be realized by a computer program/software. This software may be loaded into an operating memory of a data processor, and when run, is configured to execute the method according to the embodiments of the present disclosure.

A demonstrative embodiment of the present disclosure covers both of the following: creating/using a computer program/software of the present disclosure from the start, and switching an existing program/software to use of a computer program/software of the present disclosure by means of an update.

According to another embodiment of the present disclosure, a machine (e.g. computer) readable medium is provided, for example a CD-ROM, wherein the readable medium has computer program code stored thereon; when executed, the computer program code causes a computer or processor to execute the method according to the embodiments of the present disclosure. The machine-readable medium is for example an optical storage medium or solid-state medium supplied with other hardware or as part of other hardware.

A computer program for executing the method according to the embodiments of the present disclosure may also be issued in another form, e.g. via the internet or another wired or wireless telecommunication system.

The computer program may also be provided on a network such as the world wide web, and can be downloaded from such a network into an operating computer of a data processor.

It must be pointed out that the embodiments of the present disclosure are described with reference to different subject matters. In particular, some embodiments are described with reference to method-type claims, whereas other embodiments are described with reference to device-type claims. However, those skilled in the art will know from the descriptions above and below that unless otherwise specified, besides any combination of features of one type of subject matter, any combination of features relating to different subject matters are also regarded as being disclosed in the present application. Furthermore, it is possible to combine all features, to provide a synergistic effect greater than the simple sum of features.

Specific embodiments of the present disclosure have been described above. Other embodiments are within the scope of the attached claims. In some cases, actions or steps recorded in the claims may be executed in a different order from that in the embodiments but still achieve the desired result. Furthermore, the processes depicted in the drawings do not necessarily require to be performed in the specific order or consecutive order shown in order to achieve the desired result. In some embodiments, multi-task processing and parallel processing are also possible or possibly advantageous.

The present disclosure has been described above with reference to specific embodiments; those skilled in the art should understand that the technical solution of the present disclosure may be realized in various ways without departing from the spirit and basic features of the present disclosure. Particular embodiments are merely schematic, not restrictive. Furthermore, these embodiments may be combined at will to achieve the object of the present disclosure. The scope of protection of the present disclosure is defined by the attached claims.

The word “comprises” in the specification and claims does not rule out the existence of other elements or steps; expressions such as “first” and “second” do not indicate order, and do not define quantity. The functions of the elements described in the specification or recorded in the claims may also be split up or combined, and realized by corresponding multiple elements or a single element

The invention claimed is:

1. A method for determining a wearing state of earphones, comprising:

determining an onto-ears event or off-ears event experienced by the earphones on the basis of first data indicating motion of the earphones;

determining a first wearing state of the earphones on the basis of second data indicating proximity of the earphones to a user's skin;

determining the wearing state of the earphones on the basis of the determined onto-ears event or off-ears event and the first wearing state;

comparing third data indicating motion of the earphones with a first predetermined threshold, to determine whether the earphones have been picked up, wherein the third data is collected before the first data; and collecting the first data at a second data collection frequency higher than a first data collection frequency, in response to determining that the earphones have been picked up based on the third data, wherein the third data is collected at the first data collection frequency, and wherein the step of determining the onto-ears event or off-ears event of the earphones comprises determining the onto-ears event or the off-ears event of the earphones based on the first data, in response to determining that the earphones have been picked up.

2. The method according to claim 1, wherein the step of determining the wearing state of the earphones comprises:

when it is determined that the earphones have experienced the onto-ears event and the first wearing state indicates that the earphones are in a worn state, determining that the wearing state of the earphones is a worn state.

3. The method according to claim 2, wherein the step of determining the wearing state of the earphones comprises:

when it is determined that the earphones have experienced the off-ears event and the first wearing state indicates that the earphones are in a non-worn state, determining that the wearing state of the earphones is a non-worn state.

4. The method according to claim 1, wherein the step of determining an onto-ears event or off-ears event of the earphones comprises:

separately comparing the first data with a first predetermined mode indicating the onto-ears event of the earphones and a second predetermined mode indicating the off-ears event of the earphones; and determining the onto-ears event or the off-ears event on the basis of the comparison result.

5. The method according to claim 1, wherein the step of determining a first wearing state of the earphones comprises:

determining the first wearing state of the earphones on the basis of the second data indicating proximity of the earphones to the user's skin, in response to determining the onto-ears event or the off-ears event.

6. The method according to claim 1, wherein the step of determining a first wearing state of the earphones comprises:

determining the first wearing state of the earphones on the basis of the second data indicating proximity of the earphones to the user's skin, in response to determining that the earphones have been picked up.

7. The method according to claim 1, wherein the step of determining a first wearing state of the earphones comprises:

comparing an amplitude of the second data with a second predetermined threshold; and determining the first wearing state of the earphones on the basis of a result of the comparison.

8. The method according to claim 5, wherein the step of determining a first wearing state of the earphones comprises:

extracting a pulse signal from the second data, in response to determining the off-ears event;

comparing an amplitude and a pulse width of the pulse signal with a second predetermined threshold and a third predetermined threshold respectively; and determining the first wearing state of the earphones on the basis of a result of the comparison.

9. A device for determining a wearing state of earphones, comprising:

a receiving unit, configured to acquire first data and third data indicating motion of the earphones and second data indicating proximity of the earphones to a user's skin; and a processing unit, configured to execute the method steps according to claim 1.

10. Earphones, comprising:

an acceleration sensor, configured to collect first data and third data indicating motion of the earphones;

a proximity sensor, configured to collect second data indicating proximity of the earphones to a user's skin; and the device for determining a wearing state of earphones according to claim 9.

11. The earphones according to claim 10, further comprising a control unit, configured to switch an operational state of the earphones on the basis of the wearing state of the earphones that is determined.

12. The earphones according to claim 11, wherein the control unit is further configured to activate the proximity sensor to collect the second data, in response to determining that the earphones have been picked up on the basis of the third data or in response to determining that the earphones have experienced an onto-ears event or off-ears event on the basis of the first data.

13. A non-transitory machine-readable storage medium, storing a computer program instruction which, when run, causes a processor to execute the method steps according to claim 1.

* * * * *